(12) United States Patent
Issac

(10) Patent No.: US 10,479,244 B1
(45) Date of Patent: Nov. 19, 2019

(54) AUTOMOBILE PASSENGER COMPARTMENT CONSOLE INSERT

(71) Applicant: Amos Issac, Laurelton, NY (US)

(72) Inventor: Amos Issac, Laurelton, NY (US)

( * ) Notice: Subject to any disclaimer, the term of this patent is extended or adjusted under 35 U.S.C. 154(b) by 0 days.

(21) Appl. No.: 15/939,084

(22) Filed: Mar. 28, 2018

(51) Int. Cl.
*B60N 3/00* (2006.01)
*B60N 2/60* (2006.01)
*B60N 2/90* (2018.01)

(52) U.S. Cl.
CPC ............. *B60N 2/6009* (2013.01); *B60N 2/91* (2018.02); *B60N 3/001* (2013.01); *B60N 3/002* (2013.01)

(58) Field of Classification Search
CPC ............ B60N 2/91; B60N 3/001; B60N 3/002
USPC .................... 296/65.01, 24.34, 37.8
See application file for complete search history.

(56) References Cited

U.S. PATENT DOCUMENTS

| 3,428,357 | A * | 2/1969 | Lueck | B60N 2/787 296/24.34 |
| 7,527,314 | B2 * | 5/2009 | Dohan | B60R 11/00 296/37.8 |
| 7,758,090 | B2 * | 7/2010 | Gregory | B60R 11/00 296/1.07 |
| 8,056,970 | B1 * | 11/2011 | Phillips | B60N 2/6009 296/1.07 |
| 8,267,291 | B2 * | 9/2012 | Simon | B60R 11/00 224/275 |
| D741,248 | S * | 10/2015 | Boss | D12/422 |
| 9,174,561 | B1 * | 11/2015 | Ferlisi Wilson | B60N 3/00 |
| 9,272,669 | B2 * | 3/2016 | Demos | B60R 7/043 |
| 9,701,233 | B1 * | 7/2017 | Farooq | B60N 2/6009 |
| 9,868,375 | B1 * | 1/2018 | Kachel | B60N 3/08 |
| 9,963,053 | B2 * | 5/2018 | Barron | B60N 2/7005 |
| 2007/0241581 | A1 * | 10/2007 | Martin | B60N 3/00 296/37.8 |
| 2008/0283565 | A1 * | 11/2008 | Simon | B60R 11/00 224/542 |
| 2009/0134688 | A1 * | 5/2009 | Waltman | B60N 2/6009 297/463.2 |
| 2009/0224563 | A1 * | 9/2009 | Gregory | B60R 11/00 296/1.07 |
| 2011/0266820 | A1 * | 11/2011 | Hurwitz | B60N 2/6009 296/1.07 |
| 2012/0242115 | A1 * | 9/2012 | Schreiber | B60N 2/24 297/180.12 |
| 2017/0267188 | A1 * | 9/2017 | Wilkinson | B60R 11/02 |

FOREIGN PATENT DOCUMENTS

| EP | 1902898 A2 * | 3/2008 | ............ B60N 2/206 |
| WO | WO-2018037215 A1 * | 3/2018 | ............... B60N 2/91 |

* cited by examiner

*Primary Examiner* — Dennis H Pedder
(74) *Attorney, Agent, or Firm* — Edwin D. Schindler

(57) ABSTRACT

An insert for a passenger compartment in a vehicle is preferably made of a compressible foam with a handle inserted on a generally flat top. The opposite or bottom side of the insert includes a channel adapted to conform with the handbrake in the vehicle. The compressible main body fits between the seat and the central console and prevents the accidental dropping of objects into the space therebetween.

6 Claims, 10 Drawing Sheets

AUTOMOBILE PASSENGER COMPARTMENT CONSOLE INSERT

BACKGROUND OF THE INVENTION

The present invention relates, generally, to automobile passenger compartments and, more particularly, to an accessory that prevents the user from dropping such items as car keys, cellphones, and the like, from in between the console of the car and the driver and/or passenger seat of the car.

SUMMARY OF THE INVENTION

A primary object of the present invention is to provide a conformable body that is adapted to fit between a center console and a car seat.

Another object of the present invention is to provide an automobile accessory that prevents a user from accidentally dropping car keys, cellular phones, and the like between the seat and the console of the car.

Yet another object of the present invention is to provide a conformable body accessory for fitting between a car seat and the center console that includes a removable, washable cover.

Still yet another object of the present invention is to provide conformable body accessory for fitting between a car seat and the center console that includes a handle for easy placement, adjustment and removal.

Additional objects of the present invention will appear as the description proceeds.

The present invention overcomes the shortcomings of the prior art by providing an easily placeable and removable wedge-like body that conforms to the space between a car's seat and the centrally located console.

More particularly, the present invention provides an insert for the passenger compartment of a vehicle wherein the vehicle passenger compartment includes at least one seat separated from a central console and in which the central console includes a handbrake with a space existing between the seat and the central console, and wherein said insert comprises a main body having a longitudinal axis extending from a front end to a rear end with the main body further having a substantially flat top with a handle grip indentation located therein and with the substantially flat top further including a handle located proximate the handle indentation. The main aid main body further including a bottom channel extending along the longitudinal axis and wherein the bottom channel is on a side opposite to the substantially flat top, so that said main body may be inserted in the space between the seat and the central console, such that an existing handbrake is accommodated by the bottom channel and, as such, the handbrake is accessible to the driver and in which the insert prevents items from being accidentally dropped in the space between, for example, either the driver's or the passenger's seat and the central console, when used for front seat occupants of the automobile. Where permitted by the automobile's design, the insert of the present invention may be used in middle or rear seating of the automobile.

It is preferable that there by a wedge-like body that will conform to the existing space between a car seat and the center console in an automobile or truck.

It is further preferable to have the conformable body of the present invention to be fitted with a handle or the like to aid in placing or removing the accessory.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Figure 1:
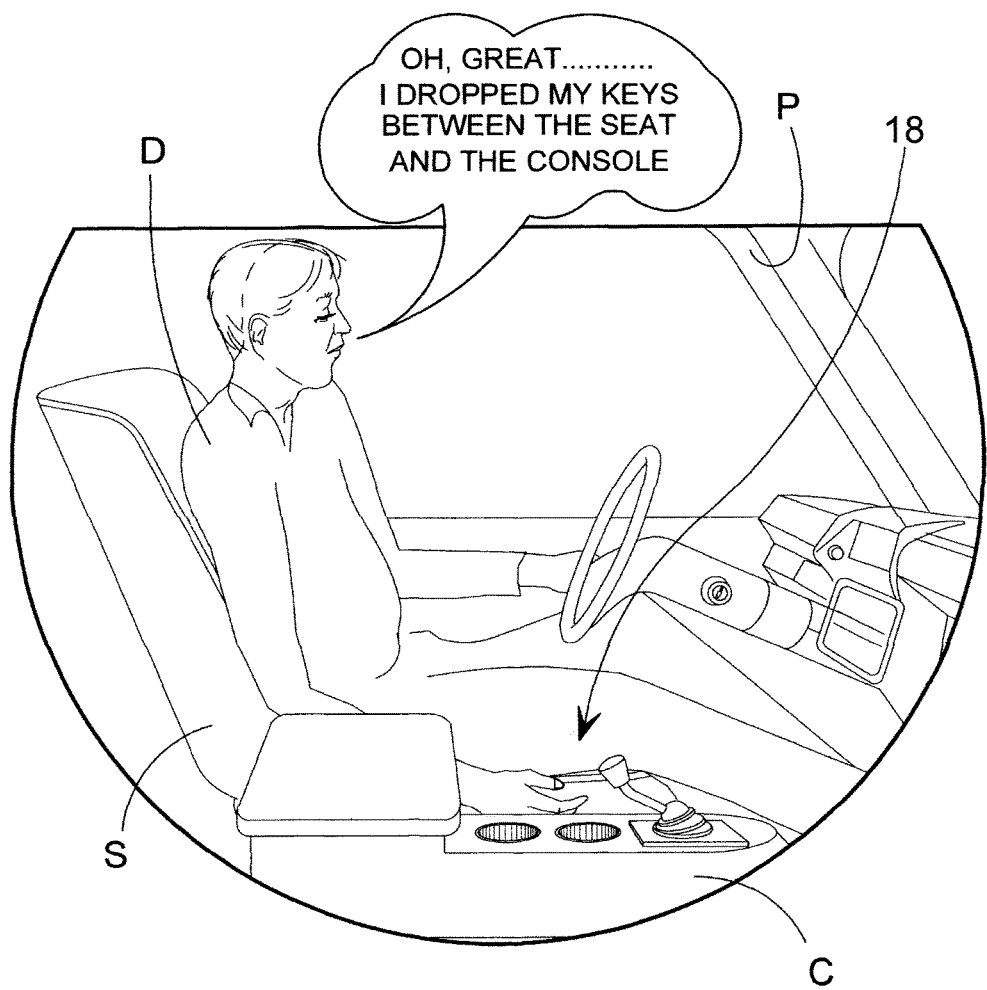
FIG. 1 is a perspective overview of the prior art.

Turning now descriptively to the drawings, in which similar reference characters denote similar elements throughout the several views, the figures illustrate the use of the present invention. With regard to the reference numerals used, the following numbering is used throughout the various drawing figures:

10 present invention
14 handle
16 compressible body portion
18 existing seat/console space
20 body front end
22 body rear end
26 handle indentation
28 body cover
30 compressible foam
32 flat top surface
34 dividing center line
36 first body half
38 second body half
40 vehicle handbrake
D driver/user
P vehicle compartment
S car seat
C center console

DETAILED DESCRIPTION OF THE DRAWING FIGURES AND PREFERRED EMBODIMENTS

In FIG. 1 the prior art is shown. It is a common mishap that the driver D of the automobile, as they are entering the passenger compartment P, may inadvertently drop their car keys. When this occurs, and the item (not seen in these Figures) falls between the seat S and the central console C into the space 18 it can be annoying to have to retrieve the item. In the case of one who is disabled or injured, it can be impossible. Additionally, if an item is dropped while the vehicle is in motion, it can roll (such as in the case of a soda can or bottle) and be lodged underneath a control pedal. In the case of something like a telephone (smart or cellular) it can become lost or difficult to find in an emergency. The present invention directly addresses this problem.

Figure 2:
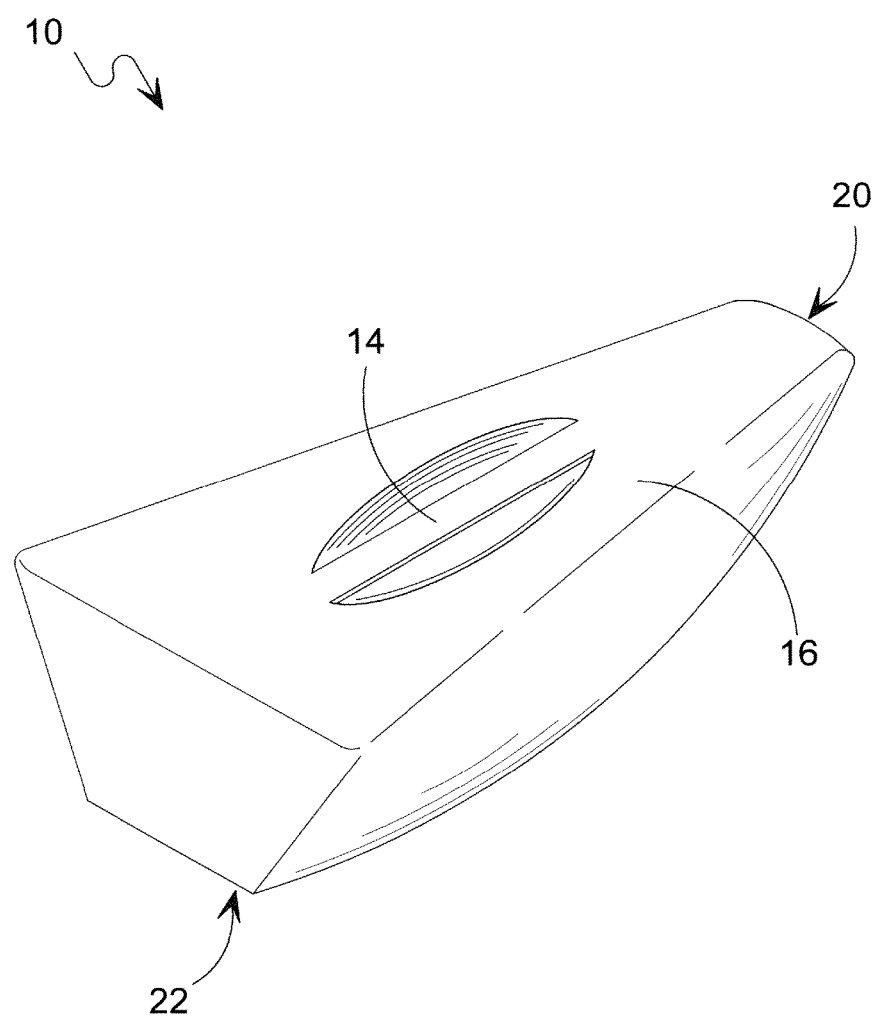
FIG. 2 is a perspective view of the present invention.

In FIG. 2 the instant invention is shown and is indicated at 10. The present invention 10 in FIG. 2 includes the compressible body housing 16, the handle 14, a front end 20 and a rear end 22. The compressible body housing 16 could be made of a variety of materials such as resilient plastic foam. This could be an open or closed cell type of foam, or it could be a memory foam. A number of cushioning-type foams could be used in the application with the compressive resistance being optimized for easier placement and retrieval into and from space 18. The present invention 10 also includes a handle 14 for gripping and manipulating the body housing 16.

Figure 3:
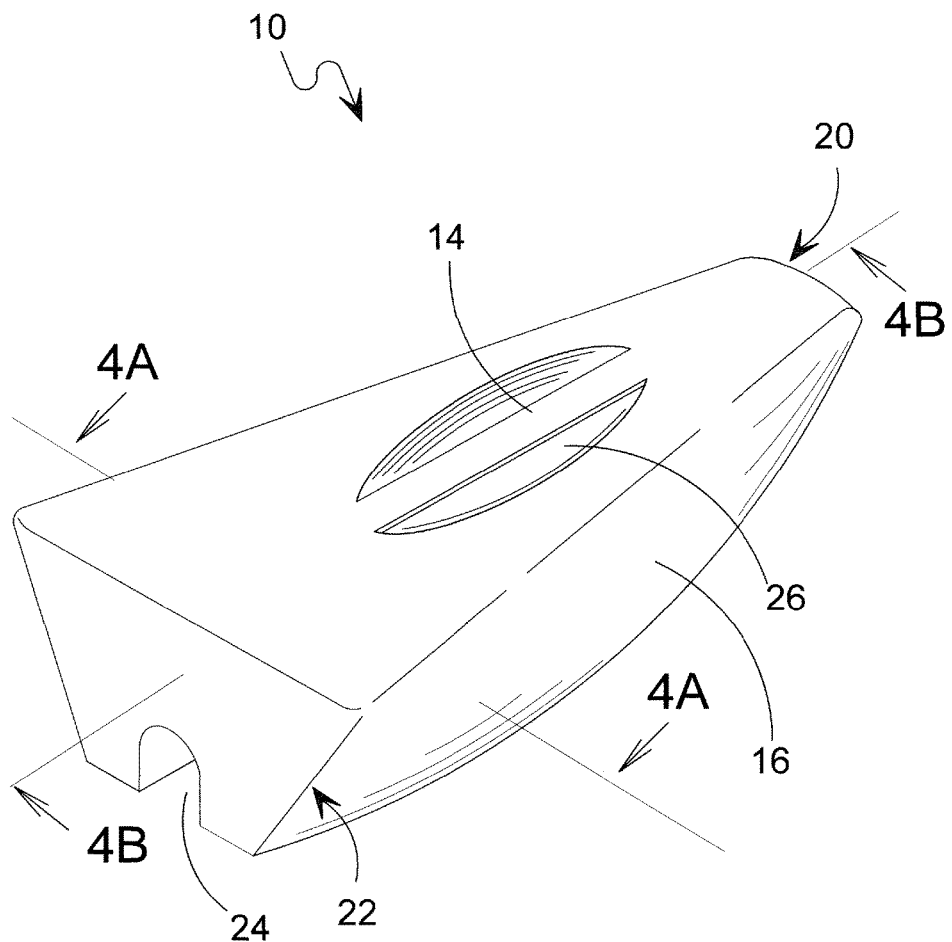
FIG. 3 is further perspective view of the present invention with the longitudinal axis and a single example lateral axis shown through lines 4A-4A and 4B-4B, respectively.

FIG. 3 shows another perspective view of the present invention 10 with the handle 14, body 16, and front and rear ends 20, 22. The line 4A-4A defines a longitudinal axis and the line 4B-4B defines a lateral axis (the term "lateral axis": is used for explanatory purposes in this description). Also seen in FIG. 3 are the bottom channel 24 and the handle indentation 26.

Figure 4A:
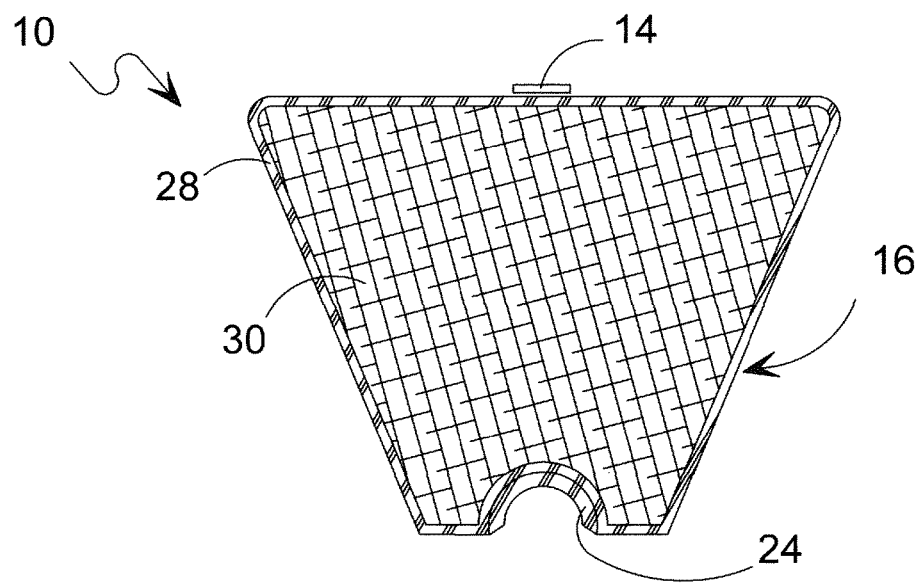
FIGS. 4A and 4B are sectional views along the lines 4A-4A and 4B-4B seen in FIG. 3.
Figure 4B:
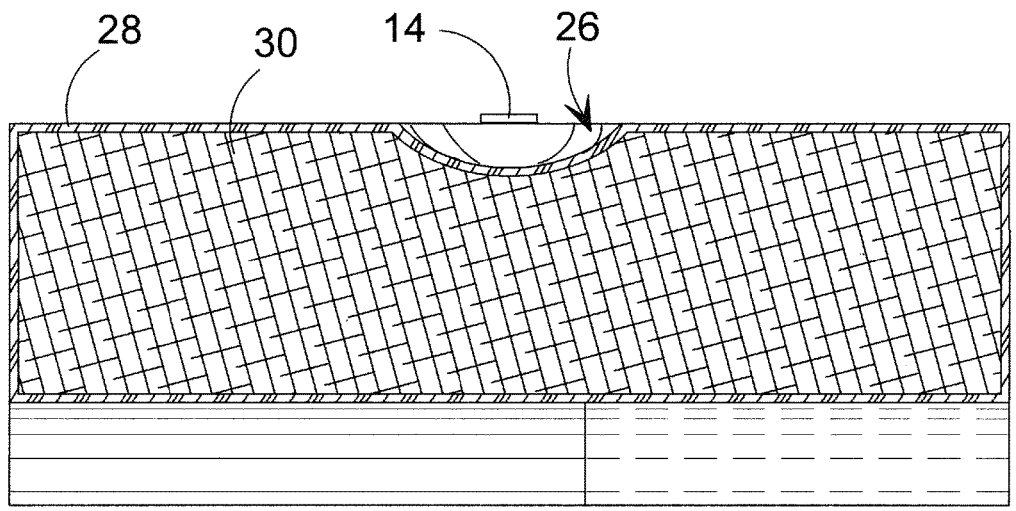

Turning to FIGS. 4A and 4B, there is shown two cross-sectional views taken along the lines 4A-4A and 4B-4B. Immediately seen in these Figures are the body cover 28 and the compressible foam 30 that make up the body housing 16. It is contemplated that this cover 28 could be made of some waterproof and/or stain-proof material and that the compressible foam be made of some material such that the resilience of the main body 16 would allow it to be placed and removed from the space 18 (as seen in FIG. 1) easily.

Figure 5:
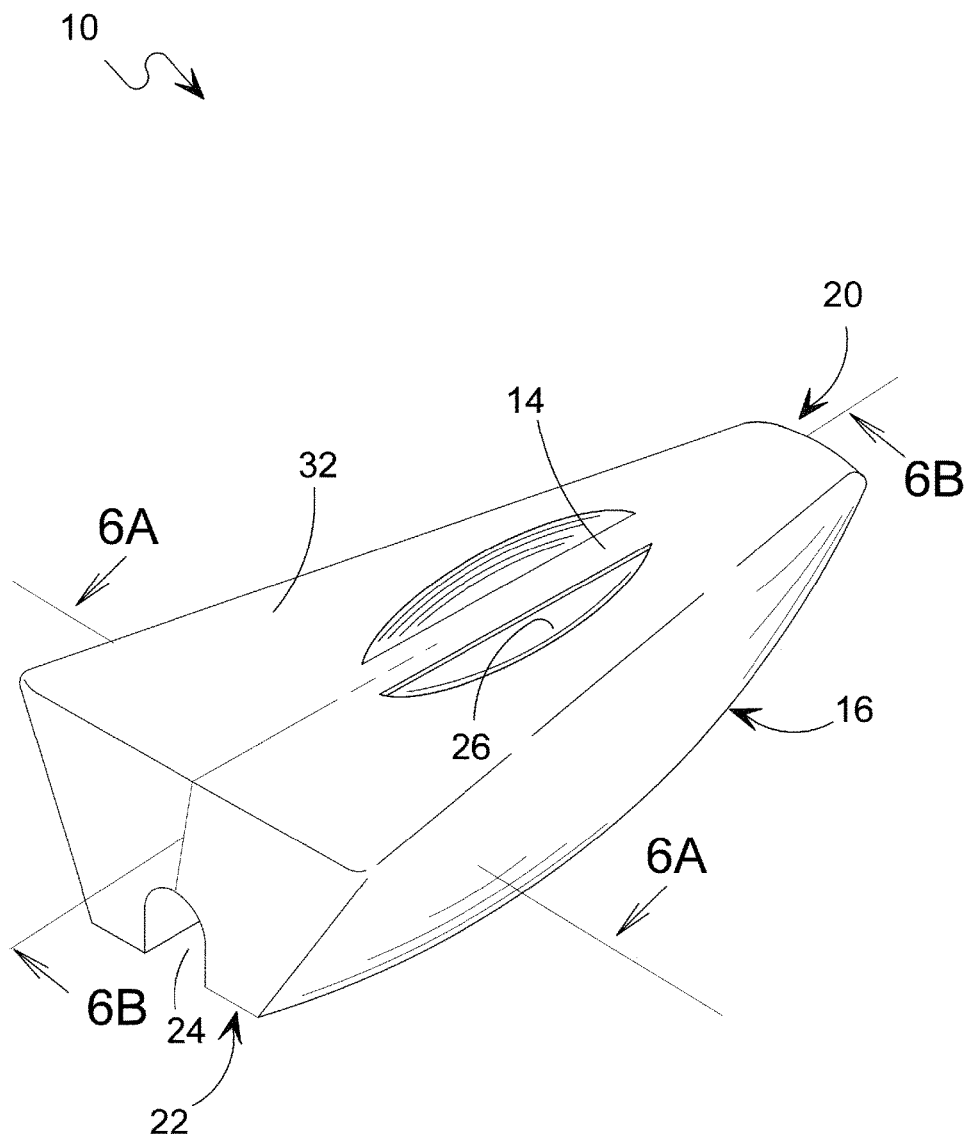
FIG. 5 is a perspective view of the present invention with an optional cover and additionally showing a longitudinal axis and a single example lateral axis shown through lines 6A-6A and 6B-6B, respectively.

In FIG. 5 we see another perspective view of the present invention 10. In this view the substantially, or generally, flat top surface 32 is pointed out. Handle indentation 26 is formed on this surface 32 and the handle itself 14 is located over it. Channel 24 and main body 16 are also pointed to. As in FIG. 3 above, the longitudinal and lateral axes are described by lines 6A-6A and 6B-6B respectively.

Figure 6A:
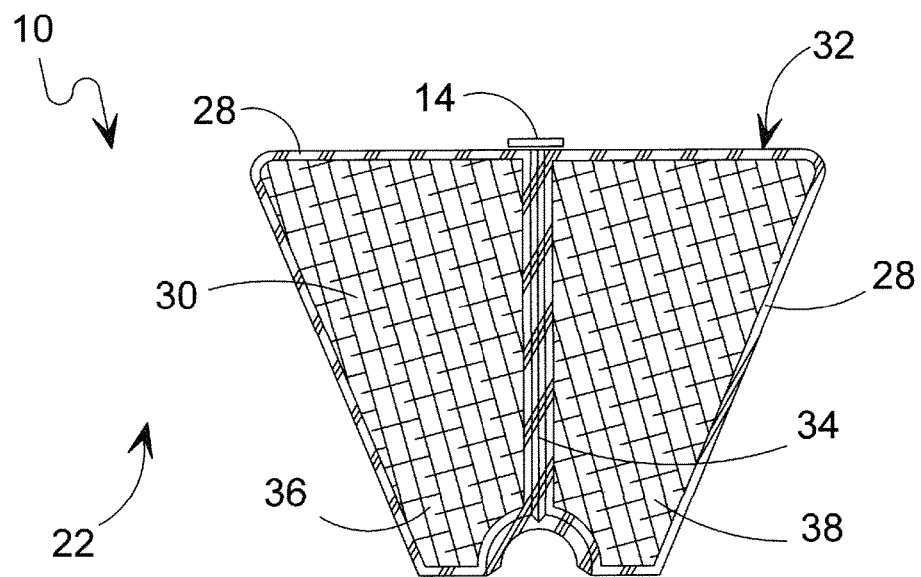
FIGS. 6A and 6B are sectional views along the lines 6A-6A and 6B-6B seen in FIG. 5.
Figure 6B:
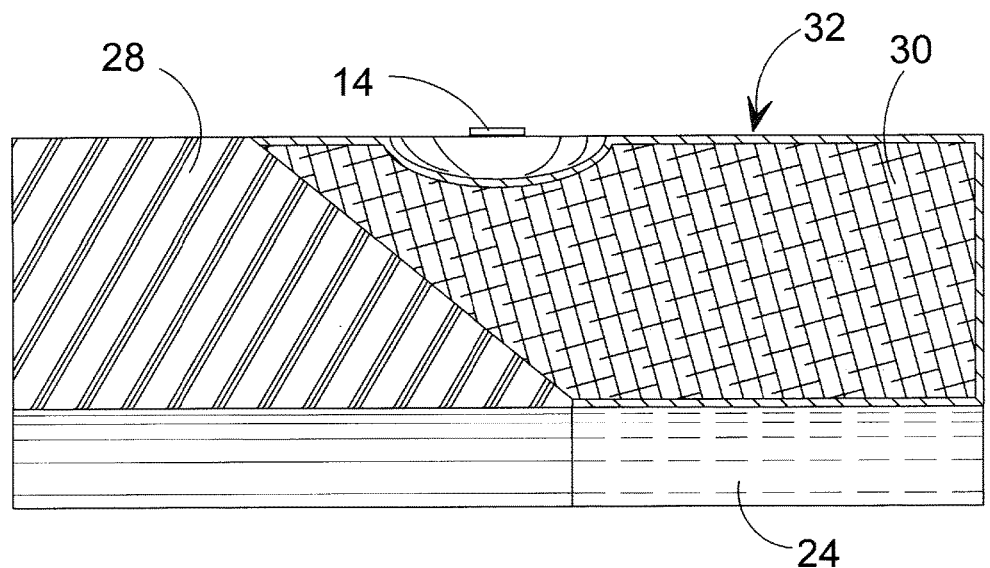

FIGS. 6A and 6B show the sectional views as defined by lines 6A-6A and 6B-6B in FIG. 5. Seen therein are handle 14, channel 24, cover portion 28, compressible foam 30 and the flat top portion 32. It should be noted here that cover 28 could be removable and be secured to body portion 16 by elastic securing means (elastic band), a slipover friction-type fit, zippers, or hook and loop type fasteners. Other engagement with the body 16 could of course be used. It should also be noted that the body 16 could be made unitary, with a waterproof/stain-proof coating. Also seen in these Figures is an alternative embodiment where the body 16 is split along dividing center line 34 to potentially have body 16 in two parts. These parts could be held together by hook-and-loop type fasteners or the like, or could be entirely separate, as desired. These two halves are indicated at 36 and 38 as first and second body halves.

Figure 7:
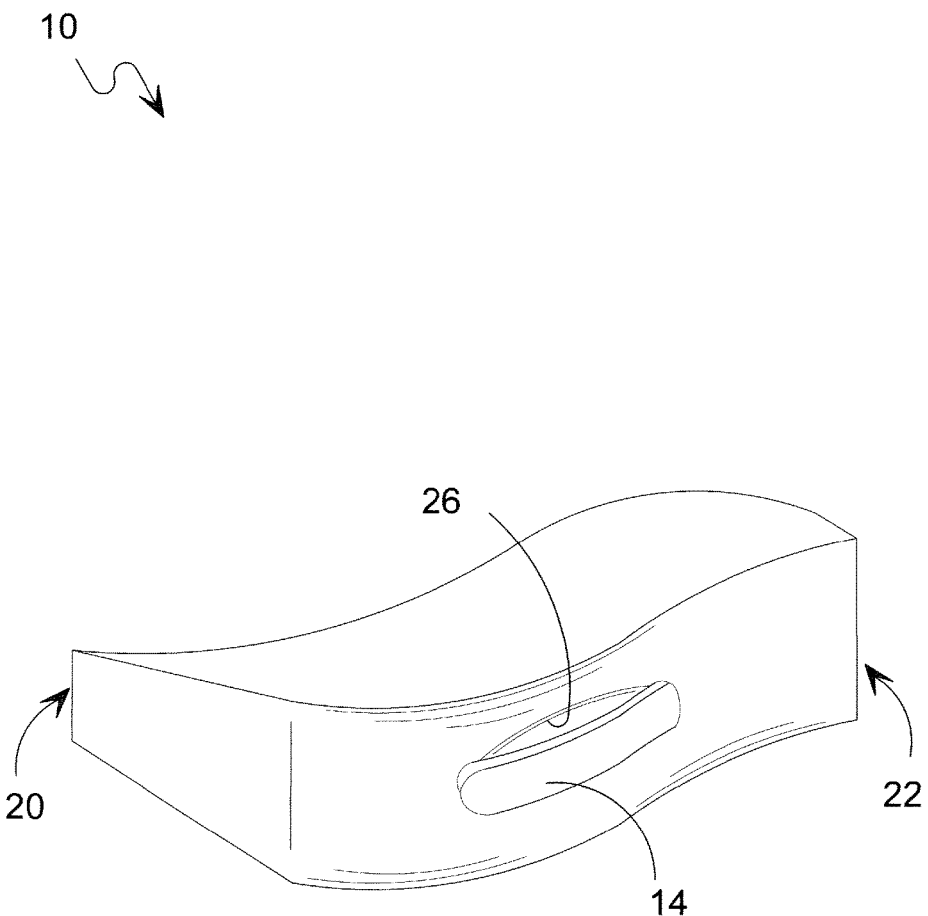
FIG. 7 is a perspective view of an alternative embodiment of the present invention.

Turning to FIG. 7, an alternative embodiment of the present invention 10 is shown. This embodiment is contemplated as to be "softer" than those shown above. Handle 14, main compressible body 16, and handle indentation 26 are shown as are front end 20 and rear end 22.

Figure 8:
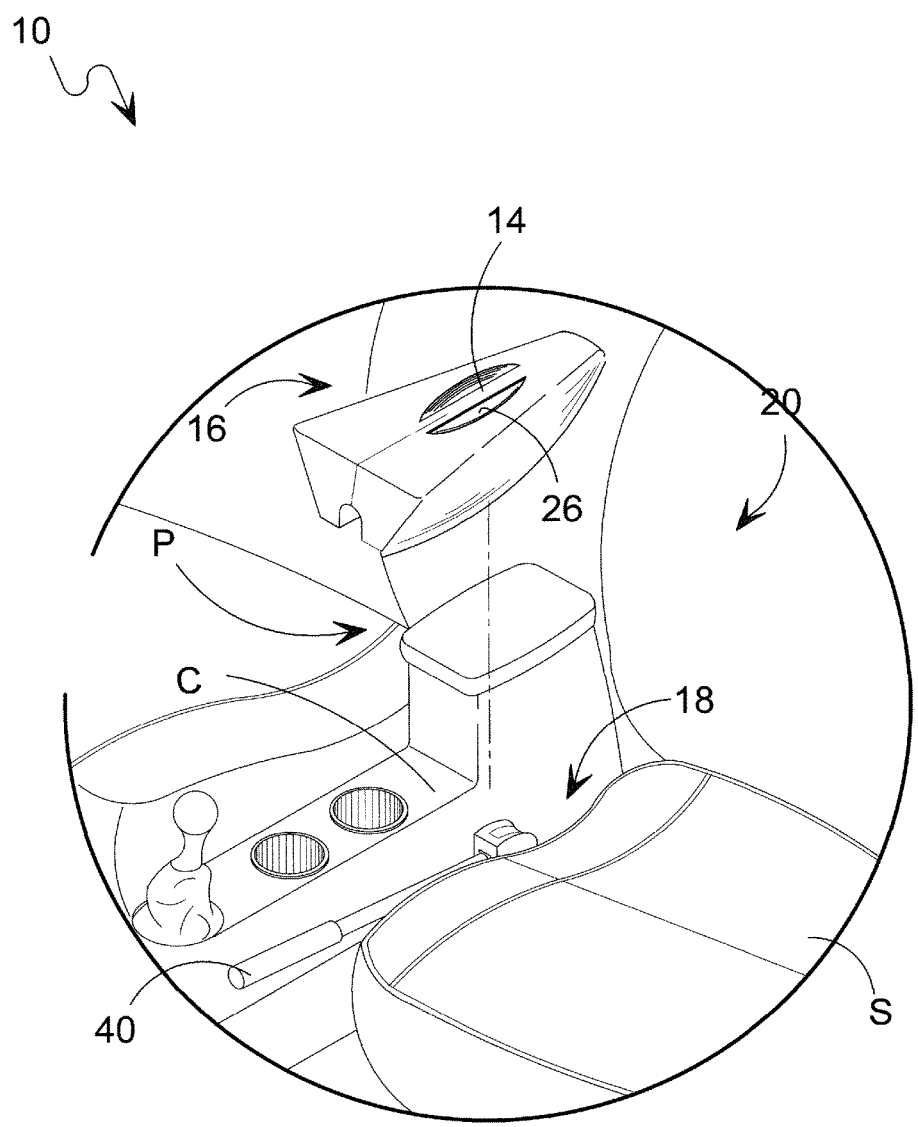
FIG. 8 is a perspective overview of the present invention located above and between the console and seat in an automobile passenger compartment.

In FIG. 8, as shown is the present invention 10 in the environment it is to be used, i.e., the passenger compartment P of a vehicle. The invention 10 is placed between the seat S and the central console C.

Figure 9:
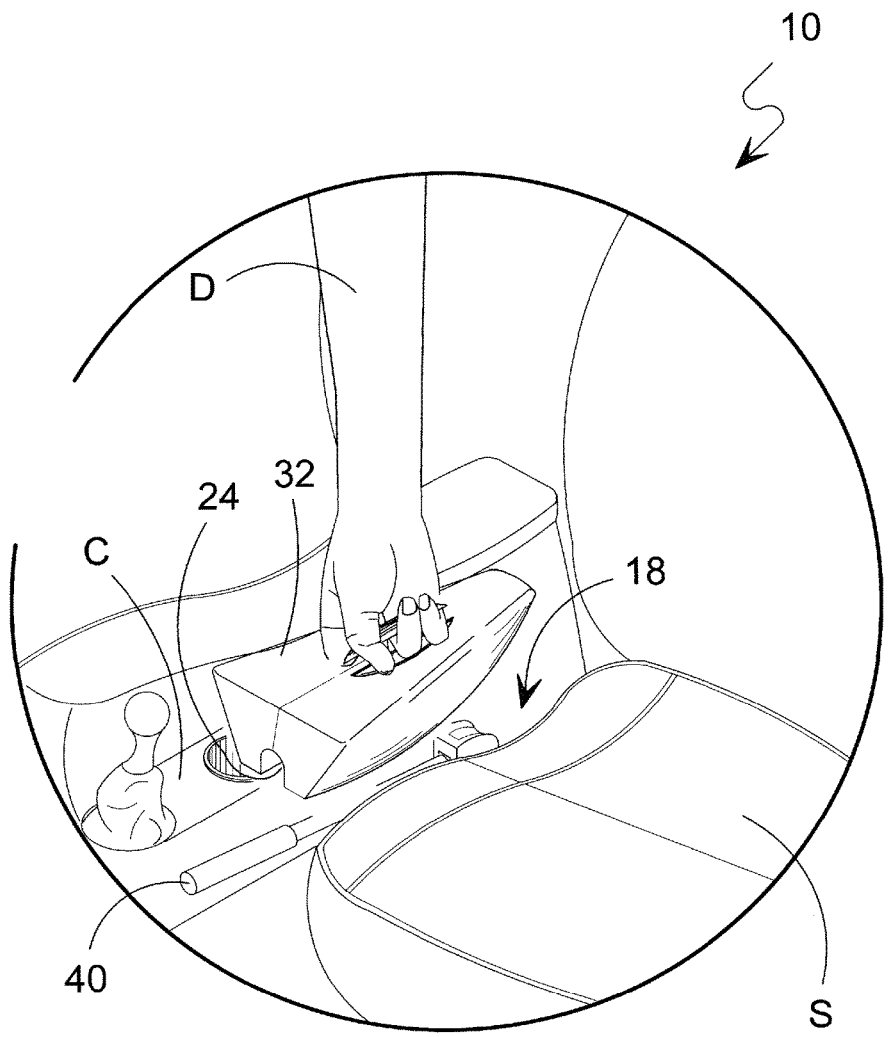
FIG. 9 is a perspective overview of a user in the process of placing the instant invention between the console and a seat in a vehicle; and, FIG. 10 is a perspective overview of the present invention in place between the console and the seat.

FIG. 9 shows the present invention 10 being put in place in space 18. Note that channel 24 is adapted to fit over the handbrake 40. This allows the handbrake 40 to still be used when the invention 10 body 16 is in place. Channel 24 is located opposite the flat top 32 of the main compressible body 16.

Figure 10:
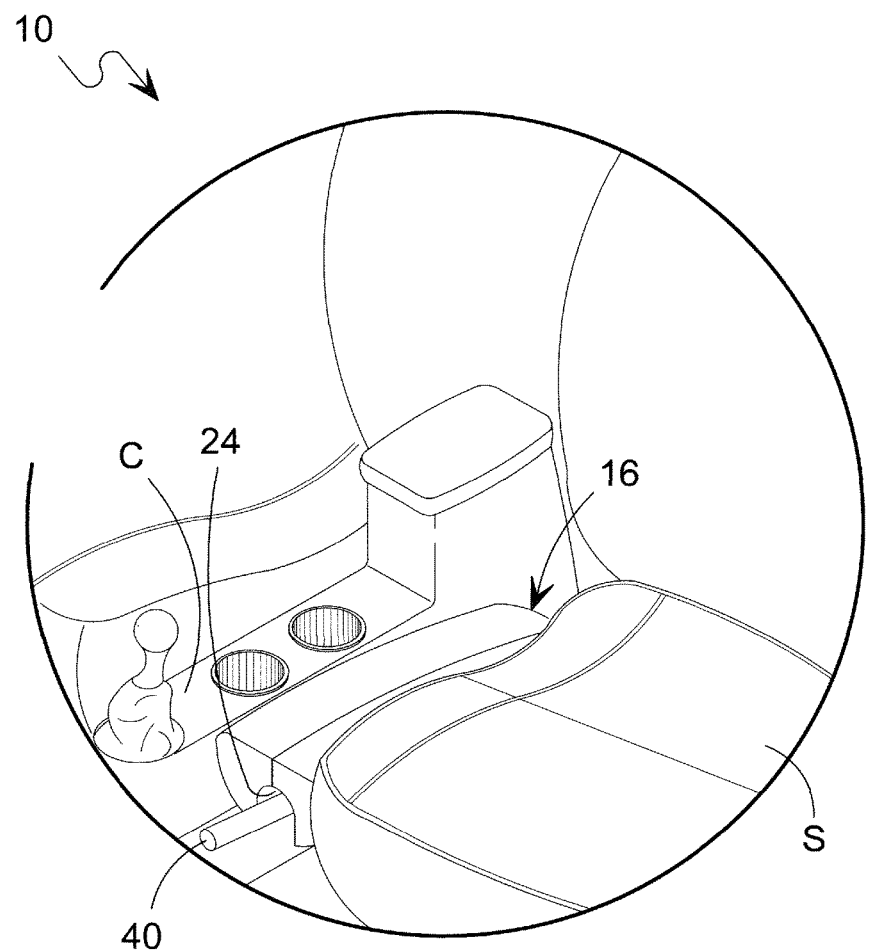

Finally, in FIG. 10 the present invention 10 is shown in place between the seat S and the center console C. The body 16 is placed such that channel 24 encompasses the handbrake 40.

While only several embodiments of the present invention have been shown and described, it will be obvious to those skilled in the art that many modifications may be made to the present invention without departing from the spirit and scope thereof.

What is claimed is:

1. An insert for a passenger compartment of a vehicle wherein the passenger compartment includes at least one seat separated from a central console wherein the central console includes a handbrake with a space existing between the at least one seat and the central console, said insert for the passenger compartment comprising:
   a main body having a longitudinal axis extending from a front end to a rear end, said main body further including a substantially flat top with a handle grip indentation located therein with said substantially flat top further including a handle located proximate said handle indentation, said main body further including a bottom channel extending along said longitudinal axis, wherein said bottom channel is a side opposite from said substantially flat top,
   whereby said main body is able to be inserted in the space between the seat and the central console so that an existing handbrake is accommodated by said bottom channel for permitting the handbrake to be accessible to a driver of the vehicle and wherein said insert prevents items from being dropped in the space between the seat and the central console.

2. The insert as claimed in claim 1, wherein said main body is comprised of a compressible foam.

3. The insert as claimed in claim 1, wherein said main body further includes a cover portion that is stain-proof and water-resistant.

4. An insert for the passenger compartment of a vehicle wherein the vehicle passenger compartment includes at least one seat separated from a central console and wherein the central console includes a handbrake with a space existing between the seat and the central console, said insert comprising:
   a main body having a longitudinal axis extending from a front end to a rear end, said main body further having a substantially flat top with a handle grip indentation located therein, said substantially flat top further including a handle located proximate said handle indentation, said main body further including a bottom channel extending along said longitudinal axis wherein said bottom channel is on a side opposite from said substantially flat top and said main body further including a center dividing line separating said main body into a first separate body half and a second separate body half, wherein said center dividing line is parallel to said longitudinal axis and additionally extends parallel to, and through, said bottom channel and wherein said first body half and said second body half are removably attachable to one another, whereby said main body is able to be inserted in the space between the seat and the central console so that an existing handbrake is accommodated by said bottom channel and, as such, the handbrake is accessible to a driver of the vehicle and wherein said insert prevents items from being dropped in the space between the seat and the central console.

5. The insert as claimed in claim 4, wherein said main body is comprised of a compressible foam.

6. The insert as claimed in claim 4, wherein said main body further includes a cover portion that is stain-proof and water-resistant.

\* \* \* \* \*